(12) United States Patent  
Nakase (10) Patent No.: US 9,197,815 B2
(45) Date of Patent: Nov. 24, 2015

(54) IMAGE MANAGEMENT APPARATUS AND IMAGE MANAGEMENT METHOD

(71) Applicant: CANON KABUSHIKI KAISHA, Tokyo (JP)

(72) Inventor: Yuichi Nakase, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/322,141

(22) Filed: Jul. 2, 2014

(65) Prior Publication Data

US 2015/0022689 A1 Jan. 22, 2015

(30) Foreign Application Priority Data

Jul. 16, 2013 (JP) .................................. 2013-147921

(51) Int. Cl.
*H04N 5/232* (2006.01)
*H04N 1/21* (2006.01)
*H04N 5/225* (2006.01)

(52) U.S. Cl.
CPC ........... *H04N 5/23245* (2013.01); *H04N 1/212* (2013.01); *H04N 1/2112* (2013.01); *H04N 1/2116* (2013.01); *H04N 5/23293* (2013.01); *H04N 5/2258* (2013.01); *H04N 5/232* (2013.01)

(58) Field of Classification Search
None
See application file for complete search history.

(56) References Cited

U.S. PATENT DOCUMENTS

| 5,675,358 | A | * | 10/1997 | Bullock et al. | 345/420 |
| 2003/0052986 | A1 | * | 3/2003 | Matsumoto | 348/333.05 |
| 2007/0031141 | A1 | * | 2/2007 | Tanaka | 396/287 |
| 2009/0154833 | A1 | * | 6/2009 | Sakaue et al. | 382/282 |
| 2011/0050931 | A1 | * | 3/2011 | Fujiyama et al. | 348/220.1 |
| 2011/0102616 | A1 | * | 5/2011 | Migiyama et al. | 348/222.1 |
| 2012/0182445 | A1 | * | 7/2012 | You et al. | 348/231.2 |
| 2012/0206489 | A1 | * | 8/2012 | Miyata | 345/658 |
| 2012/0249853 | A1 | * | 10/2012 | Krolczyk et al. | 348/333.01 |
| 2014/0340538 | A1 | * | 11/2014 | Muukki et al. | 348/218.1 |
| 2014/0354848 | A1 | * | 12/2014 | Kim et al. | 348/231.2 |

FOREIGN PATENT DOCUMENTS

JP 2009-206761 A 9/2009

* cited by examiner

*Primary Examiner* — Justin P Misleh
(74) *Attorney, Agent, or Firm* — Carter, DeLuca, Farrell & Schmidt, LLP (57) ABSTRACT

An image management apparatus comprises an input unit which inputs a first image and a second image; a storage unit which stores the first image and the second image in association with each other; a selection unit which selects an image to be deleted out of the first and second images; and a control unit which performs control such that, in a case where the first image is selected by the selection unit, an option of deleting the second image stored in association with the first image is presented, and subsequently processing for deleting the first image is performed, and in a case where an instruction to delete the second image is received, processing for deleting the second image is performed without presenting an option of deleting the first image stored in association with the second image.

8 Claims, 9 Drawing Sheets

IMAGE MANAGEMENT APPARATUS AND IMAGE MANAGEMENT METHOD

BACKGROUND OF THE INVENTION

1. Field of the Invention

The present invention relates to technology for managing image data.

2. Description of the Related Art

Some mobile phones and smart phones of recent years include a normal camera (main camera) for shooting subjects visible to the photographer as well as a camera (sub camera) for shooting the photographer himself/herself and subjects on the photographer side of the camera.

Also, techniques for recording multiple image data pieces in one image file have been proposed. For example, Japanese Patent Laid-Open No. 2009-206761 discloses processing for deleting a portion of sub image data pieces in a multi-image file that includes one main image data piece, multiple sub image data pieces, and position information pieces for the respective sub image data pieces.

In Japanese Patent Laid-Open No. 2009-206761, after a portion of the sub image data pieces has been deleted from the multi-image file, the remaining data is moved to an empty area in order to suppress a reduction in the file usage efficiency, an increase in file size, and a reduction in access speed. However, in Japanese Patent Laid-Open No. 2009-206761, no consideration is given to associations between images and cases where moving images are included in the main image and sub images, and the user is not given an appropriate deletion instruction.

Also, if a main image and sub images are managed in association with each other, editing is made more user-friendly by performing processing in which, if a main image is deleted, the associated sub images are also deleted at the same time. However, it is conceivable for the user to not intend for the sub image to be deleted at the same time, yet the sub images are inadvertently deleted regardless of that fact. Also, individually deleting the sub images requires the same operation to be performed repeatedly, which is time-consuming.

Meanwhile, since the main image and the sub images are in a superior-subordinate relationship, individually editing (deleting) sub images does not negatively affect the main image, and user-friendliness is improved if it is possible to easily delete sub images.

SUMMARY OF THE INVENTION

The present invention has been made in consideration of the aforementioned problems, and realizes technology for making it possible to, when deleting images, present appropriate processing candidates according to the associations between images, types of images, and the like, and for improving user-friendliness.

In order to solve the aforementioned problems, the present invention provides an image management apparatus comprising: an input unit configured to input a first image and a second image; a storage unit configured to store the first image and the second image in association with each other; a selection unit configured to select an image to be deleted out of the first and second images; and a control unit configured to perform control such that, in a case where the first image is selected by the selection unit, an option of deleting the second image stored in association with the first image is presented, and subsequently processing for deleting the first image is performed, and in a case where an instruction to delete the second image is received, processing for deleting the second image is performed without presenting an option of deleting the first image stored in association with the second image.

In order to solve the aforementioned problems, the present invention provides an image management method comprising: a step of inputting a first image and a second image; a step of storing the first image and the second image in association with each other; a step of selecting an image to be deleted out of the first and second images; and a step of performing control such that, in a case where the first image is selected, an option of deleting the second image stored in association with the first image is presented, and subsequently processing for deleting the first image is performed, and in a case where an instruction to delete the second image is received, processing for deleting the second image is performed without presenting an option of deleting the first image stored in association with the second image.

According to the present invention, it is possible to, when deleting images, present appropriate processing candidates according to the associations between images, types of images, and the like, and to improve user-friendliness.

Further features of the present invention will become apparent from the following description of exemplary embodiments with reference to the attached drawings.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

The following describes an example in which an image management apparatus of the present invention is realized by an image capturing apparatus such as a digital camera, but the present invention is also applicable to electronic devices such as a PDA, a smart phone, or a tablet terminal, as well as information processing apparatuses such as a personal computer (PC).

Apparatus Configuration

Figure 1:
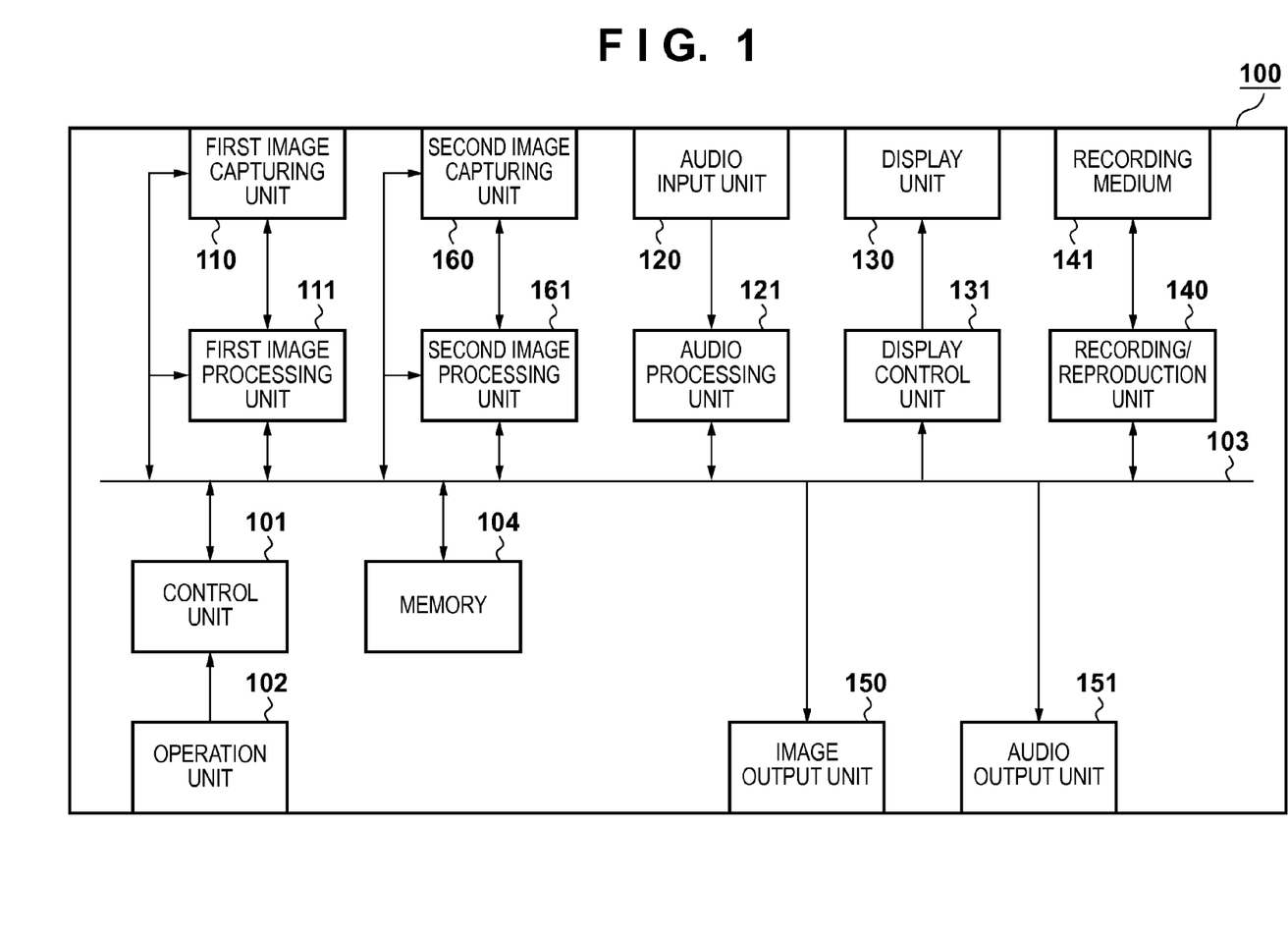
FIG. 1 is a block diagram showing a configuration of an image capturing apparatus according to an embodiment.

The following describes an overview of the configuration and functions of an image capturing apparatus 100 according to an embodiment of the present invention, with reference to FIG. 1.

In FIG. 1, a control unit 101 includes an arithmetic processing unit such as a CPU or an MPU, as well as a memory such as a DRAM or an SRAM, for example, and by executing various types of processing programs, the control unit 101 controls various later-described units of the image capturing apparatus 100 and controls data transfers between the units. Also, the control unit 101 controls the units of the image capturing apparatus 100 in accordance with operation signals from an operation unit 102 that receives user operations. Furthermore, the control unit 101 analyzes image data generated by a first image processing unit 111 and a second image processing unit 161, which will be described later, and controls the units of the image capturing apparatus 100 in accordance with the result of the analysis.

The operation unit 102 includes switches for inputting various types of operations related to shooting, such as a power button, a still image shooting button, a moving image recording start/end button, a zoom adjustment button, and an auto-focus button. Also, the operation unit 102 includes a menu display button and a determination button, as well as a cursor key, a pointing device, a touch panel, or the like, and when the user operates the operation unit 102, operation signals that correspond to the operations are output to the control unit 101.

A bus 103 is a general-purpose bus for sending various types of data, control signals, commands, and the like to blocks of the image capturing apparatus 100.

A first image capturing unit 110 and a second image capturing unit 160 each use a diaphragm or the like to appropriately adjust the light quantity of an optical image of a subject picked up by a shooting lens (not shown), and then receive the optical image with an imaging element such as a CCD sensor or a CMOS sensor so as to convert it into an image signal. The first image capturing unit 110 and the second image capturing unit 160 then convert the electrical signals generated by the imaging elements into digital image signals using A/D converters, and output the digital image signals to the first image processing unit 111 and the second image processing unit 161 respectively.

The first image processing unit 111 and the second image processing unit 161 generate image data by subjecting the image signals obtained from the first image capturing unit 110 and the second image capturing unit 160 to processing for adjusting image qualities such as the white balance (WB), color, and brightness in accordance with predetermined control values. The image data pieces resulting from the processing performed by the first image processing unit 111 and the second image processing unit 161 are then output by the control unit 101 to a memory 104 as well as an image output unit 150 and a display control unit 131 that will be described later.

In the present embodiment, the first image capturing unit 110 and the second image capturing unit 160 each have an "optical zoom" function and an "optical anti-vibration" function, and the first image processing unit 111 and the second image processing unit 161 have an "electronic zoom" function and an "electronic anti-vibration" function, for example. Here, the "optical zoom" function and the "electronic zoom" function are functions for enlarging the image in accordance with a user operation. Also, the "optical anti-vibration" function and the "electronic anti-vibration" function are functions for preventing image blur caused by vibration of the apparatus body. These functions can be used at the same time, alternatingly, or independently under control of the control unit 101.

The "optical zoom" function is a function for, according to the operation amount of the zoom button of the operation unit 102, moving the zoom lenses of the first and second image capturing units 110 and 160 so as to enlarge/reduce the optical image of the subject that is picked up. Also, the "electronic zoom" function is processing in which, according to the operation amount of the zoom button of the operation unit 102, the first and second image processing units 111 and 161 cut out a portion of the image signals generated by the first and second image capturing units 110 and 160, and generate enlarged image signals. The "optical anti-vibration" function is a function for preventing image blur by calculating a correction amount using an acceleration signal obtained from a vibration detection unit (not shown) such as an optical sensor, and moving a correction lens according to the calculated correction amount. The "electronic anti-vibration" function is a function for preventing image blur by, based on an acceleration signal from a vibration detection unit (not shown) such as an optical sensor, adjusting the positions of the image signals generated by the first and second image capturing units 110 and 160. Note that the "electronic anti-vibration" function can also be realized by shifting the readout positions in the imaging elements of the first and second image capturing units 110 and 160 based on an acceleration signal from a vibration detection unit (not shown) such as an optical sensor. These functions are known technology, and therefore will not be described in further detail.

An analog audio signal is obtained by collecting (picking up) audio around the image capturing apparatus 100 using a built-in omnidirectional microphone or an external microphone connected via an audio input terminal, for example, and an audio input unit 120 converts the obtained analog audio signal into a digital signal and outputs it to an audio processing unit 121.

The audio processing unit 121 performs processing related to audio signals, such as normalizing the level of the digital audio signal input from the audio input unit 120. The audio signal resulting from the processing performed by the audio processing unit 121 is output by the control unit 101 to the memory 104.

The memory 104 temporarily stores the image signals and the audio signal obtained by the first and second image processing units 111 and 161 and the audio processing unit 121. The first and second image processing units 111 and 161 and the audio processing unit 121 generate compressed image signals and a compressed audio signal by reading out the image signals and audio signal temporarily stored in the memory 104 and then performing image signal encoding and audio signal encoding or the like. The control unit 101 then outputs the compressed image signals and compressed audio signal to a recording/reproduction unit 140.

The recording/reproduction unit 140 records the compressed image signals and compressed audio signal generated by the first and second image processing units 111 and 161 and the audio processing unit 121 to a recording medium 141 along with parameters, a control program related to shooting, and the like. Also, in the case of not subjecting the audio signal to compression encoding, the control unit 101 outputs the audio signal generated by the audio processing unit 121 and the compressed image signals generated by the first and second image processing units 111 and 161 to the recording/reproduction unit 140, and causes them to be recorded to the recording medium 141. Here, the recording medium 141 may be built into the apparatus, or may be removable from the apparatus, and it need only be able to record compressed image signals, compressed audio signals, and audio signals generated as described above, as well as various types of other data. Various formats of recording media can be used as the recording medium 141, such as a hard disk, an optical disk, a magnetic optical disk, a CD-R, a DVD-R, a magnetic tape, a nonvolatile semiconductor memory, or a flash memory.

Also, in accordance with a control instruction from the control unit 101, the recording/reproduction unit 140 reads out compressed image signals, compressed audio signals, audio signals, various types of data, and programs that are recorded on the recording medium 141. Compressed image signals and a compressed audio signal that have been read out by the recording/reproduction unit 140 are output to the first and second image processing units 111 and 161 and the audio processing unit 121 respectively. The first and second image processing units 111 and 161 as well as the audio processing unit 121 temporarily store the compressed image signals and the compressed audio signal in the memory 104, and then decode them using a predetermined procedure. Then, the audio processing unit 121 outputs the decoded audio signal to an audio output unit 151, and the first and second image processing units 111 and 161 output the decoded image signals to the image output unit 150 and the display control unit 131. If an uncompressed audio signal is recorded on the recording medium 141, the control unit 101 outputs that audio signal directly to the audio output unit 151.

The audio output unit 151 is configured by an audio output terminal for example, and outputs an audio signal in order to output audio from headphones, speakers, or the like that are connected to the apparatus. The audio output unit 151 may be built into the image capturing apparatus 100 as a speaker for outputting audio that corresponds to an audio signal.

The image output unit 150 is configured by an image output terminal for example, and outputs image signals in order to display images on an external display or the like that is connected to the apparatus. Also, the audio output unit 151 and the image output unit 150 may be one integrated terminal such as an HDMI (registered trademark) (High-Definition Multimedia Interface) terminal.

The display control unit 131 causes a display unit 130 to display images that correspond to image signals output from the first image processing unit 111 and the second image processing unit 161, menu screens for allowing the user to operate the apparatus, and the like. The display unit 130 may take any form as long as it is a display device such as a liquid crystal display, an organic EL display, or electronic paper.

Operation

The following describes basic operations of the image capturing apparatus 100 of the present embodiment.

When the user operates the power button of the operation unit 102 of the image capturing apparatus 100 of the present embodiment, a startup instruction is output from the operation unit 102 to the control unit 101. Upon receiving this instruction, the control unit 101 controls a power supply unit (not shown) so as to supply power to the blocks of the image capturing apparatus 100.

When power is supplied, the control unit 101 determines which operation mode has been set using a mode switching switch of the operation unit 102, for example. Examples of operation modes include a still image shooting mode, a moving image shooting mode, and a reproduction mode.

In the still image shooting mode, shooting starts when the user operates the still image shooting button of the operation unit 102 while the image capturing apparatus 100 is in the shooting standby state, and then compressed image signals are recorded to the recording medium 141, and the image capturing apparatus 100 once again returns to the shooting standby state. In the moving image shooting mode, shooting starts when the user operates the moving image recording start button of the operation unit 102 while the image capturing apparatus 100 is in the shooting standby state, and then compressed image signals and a compressed audio signal or audio signal are recorded to the recording medium 141 while shooting continues. Recording ends when the user operates a moving image recording end button of the operation unit 102, and then the image capturing apparatus 100 returns to the shooting standby state. In the reproduction mode, compressed image signals and a compressed audio signal or audio signal that correspond to a file selected by the user are read out from the recording medium 141, the audio signal is output from the audio output unit 151, and images are reproduced on the display unit 130.

Still Image Shooting Mode

The following describes the still image shooting mode.

If the still image shooting mode is set due to the user operating the operation unit 102, first the control unit 101 puts the blocks of the image capturing apparatus 100 in the shooting standby state as previously described.

In the shooting standby state, the first and second image processing units 111 and 161 output image signals to the display control unit 131, and images related to the image signals are displayed on the display unit 130. The user prepares for shooting while viewing the screen displayed in this way.

When a shooting instruction signal is output due to the user operating the still image shooting button of the operation unit 102 while in the shooting standby state, the control unit 101 outputs shooting control signals to the blocks of the image capturing apparatus 100 and performs control as described below. Specifically, control is performed such that:

The first and second image capturing units 110 and 160 convert the electrical signals generated by the imaging elements into digital image signals using A/D converters, and output the digital image signals to the first and second image processing units 111 and 161 respectively.

The first and second image processing units 111 and 161 generate image data by subjecting the digital image signals input from the first and the second image capturing units 110 and 160 to processing for adjusting image qualities such as the white balance (WB), color, and brightness. The image data pieces resulting from the processing performed by the first and second image processing units 111 and 161 are then output by the control unit 101 to the memory 104, the image output unit 150, and the display control unit 131. The user can check the captured still images by viewing the images displayed on the display unit 130.

The first and second image processing units 111 and 161 read out the image signals temporarily stored in the memory 104, subject them to predetermined encoding so as to generate compressed image signals, and output the compressed image signals to the recording/reproduction unit 140.

The recording/reproduction unit 140 writes the compressed image signals to the recording medium 141 as a still image file based on a file system such as UDF or FAT.

Note that when the encoding processing performed by the first and second image processing units 111 and 161 ends, the control unit 101 outputs control signals to the blocks of the image capturing apparatus 100 so as to return them to the shooting standby state.

Moving Image Shooting Mode

The following describes the moving image shooting mode.

The operations up to and including entering the shooting standby state are similar to the operations in the still image shooting mode described above. When a shooting instruction signal is output due to the user operating the moving image recording start button of the operation unit 102 while in the shooting standby state, the control unit 101 outputs shooting control signals to the blocks of the image capturing apparatus 100 and performs control as described below. Specifically, control is performed such that:

The first and second image capturing units 110 and 160 convert the electrical signals generated by the imaging elements into digital image signals using A/D converters, and output the digital image signals to the first and second image processing units 111 and 161 respectively.

The first and second image processing units 111 and 161 generate image data by subjecting the digital image signals input from the first and the second image capturing units 110 and 160 to image quality adjustment processing for adjusting the white balance (WB), color, brightness, and the like as described above. The image data pieces resulting from the processing performed by the first and second image processing units 111 and 161 are then output by the control unit 101 to the memory 104 and the display control unit 131, and the display control unit 131 displays moving images on the display unit 130.

Meanwhile, the audio input unit 120 converts an analog audio signal obtained by the microphone into a digital signal, and outputs the obtained digital audio signal to the audio processing unit 121. The audio processing unit 121 performs processing for normalizing the level of the input digital audio signal and the like. The control unit 101 outputs the audio signal resulting from the processing performed by the audio processing unit 121 to the memory 104. The memory 104 temporarily stores the image signals and the audio signal obtained by the first and second image processing units 111 and 161 and the audio processing unit 121.

The first and second image processing units 111 and 161 and the audio processing unit 121 generate compressed image signals and a compressed audio signal by reading out the image signals and audio signal temporarily stored in the memory 104 and then performing image signal encoding and audio signal encoding or the like. The control unit 101 then outputs the compressed image signals and compressed audio signal to the recording/reproduction unit 140.

The recording/reproduction unit 140 writes the data stream to the recording medium 141 as one moving image file based on a file system such as UDF or FAT. Also, in the case where audio is not compressed, the control unit 101 outputs the audio signal generated by the audio processing unit 121 to the recording/reproduction unit 140 along with the compressed image signals generated by the first and second image processing units 111 and 161. The recording/reproduction unit 140 writes the data stream to the recording medium 141 as one moving image file based on the previously mentioned file system.

The above operations continue while shooting is performed.

Also, during shooting, the control unit 101 outputs control signals to the first and second image capturing units 110 and 160, the first and second image processing units 111 and 161, the audio processing unit 121, and the like in accordance with operation signals input from the operation unit 102 and the result of analysis of the image data generated by the first and second image processing units 111 and 161. For example, control signals for lens movement, diaphragm adjustment, and the like are output to the first and second image capturing units 110 and 160, and control signals for image and audio adjustment are output to the first and second image processing units 111 and 161 as well as the audio processing unit 121.

Similarly, if the user operates the zoom key of the operation unit 102 during shooting, the control unit 101 controls the "optical zoom" function of the first and second image capturing units 110 and 160 or the "electronic zoom" function of the first and second image processing units 111 and 161. The control unit 101 similarly controls the previously described "optical anti-vibration" function of the first and second image capturing units 110 and 160 or the "electronic anti-vibration" function of the first and second image processing units 111 and 161.

If a shooting end signal is then output due to the user operating the moving image recording end button of the operation unit 102, the control unit 101 outputs shooting control signals to the blocks of the image capturing apparatus 100 and performs control as described below. Specifically, control is performed such that:

The first and second image processing units 111 and 161 and the audio processing unit 121 stop outputting image signals and an audio signal to the memory 104. They then read out the remaining image signals and audio signal stored in the memory 104 and subject them to predetermined encoding so as to generate compressed image signals and a compressed audio signal.

The control unit 101 generates a data stream by combining the ultimately generated compressed image signals and compressed audio signal, and outputs the data stream to the recording/reproduction unit 140. In the case where audio is not compressed, the control unit 101 outputs the audio signal generated by the audio processing unit 121 to the recording/reproduction unit 140 along with the compressed image signals.

The recording/reproduction unit 140 writes the data stream to the recording medium 141 as one moving image file based on the previously mentioned file system, and then when the supply of the data stream stops, the control unit 101 performs the following control in order to generate thumbnails.

The recording/reproduction unit 140 reads out the compressed image signals for the first frame of the moving image file recorded on the recording medium 141, and outputs them to the first and second image processing units 111 and 161. The first and second image processing units 111 and 161 temporarily store the compressed image signals in the memory 104 and decode them using a predetermined procedure.

Next, the first and second image processing units 111 and 161 perform predetermined thumbnail encoding on the obtained image signals so as to generate thumbnail compressed image signals. The control unit 101 then outputs the thumbnail compressed image signals to the recording/reproduction unit 140. The recording/reproduction unit 140 writes the thumbnail compressed images to the recording medium 141 so as to be unified with the original moving image file based on the previously mentioned file system, thus completing the moving image file, and then stops the recording operation.

When the recording operation stops, the control unit 101 outputs control signals for moving to the shooting standby state to the blocks of the image capturing apparatus 100, so as to cause them to return to the shooting standby state.

As described above, due to having multiple image capturing units and image processing units, the image capturing apparatus of the present embodiment can shoot multiple still images and/or moving images at the same time. This makes it possible for, for example, first image data corresponding to subject-side shooting to be generated by the first image capturing unit 110 and the first image processing unit 111, and second image data corresponding to photographer-side shooting to be generated by the second image capturing unit 160 and the second image processing unit 161. It is also possible to perform shooting on both sides at the same time or with a predetermined delay, and record the two image data pieces on the recording medium 141 in association with each other (this will be referred to hereinafter as "simultaneous shooting and recording").

Reproduction Mode

The following describes the reproduction mode.

If the reproduction mode is set due to the user operating the operation unit 102, the control unit 101 outputs reproduction control signals to the blocks in order to move the image capturing apparatus 100 to the reproduction state, and then performs the following control. Specifically, control is performed such that:

The recording/reproduction unit 140 reads out a still image file constituted by compressed image signals recorded on the recording medium 141, or a moving image file constituted by compressed image signals and a compressed audio signal or audio signal. The control unit 101 outputs the compressed image signals and compressed audio signal that were read out by the recording/reproduction unit 140 to the first and second image processing units 111 and 161 and the audio processing unit 121. If uncompressed audio signal is recorded, the control unit 101 outputs the audio signal directly to the audio output unit 151.

The first and second image processing units 111 and 161 and the audio processing unit 121 temporarily store the compressed image signals and the compressed audio signal in the memory 104 and decode it using a predetermined procedure. The control unit 101 then outputs the decoded audio signal to the audio output unit 151 and outputs the decoded image signals to the image output unit 150 and the display control unit 131. The display control unit 131 displays images related to the input image signals on the display unit 130, and the audio output unit 151 outputs audio related to the input audio signal from a built-in speaker or from headphones or a speaker that is connected to the apparatus.

Also, the image capturing apparatus 100 of the present embodiment reproduces still images and/or moving images that were shot and recorded at the same time. For example, if the user operates a button, the touch panel, or the like of the operation unit 102 while a first image (subject) is being displayed on the display unit 130, a second image (photographer) that was shot and recorded at the same time can also be displayed. Furthermore, it is possible to, during viewing of a reproduced image in the reproduction mode, shoot the viewer by controlling the first image capturing unit 160 and the first image processing unit 161, use the reproduced image as the first image and the shot image of the viewer as the second image, and record and reproduce these two images in association with each other.

Shooting Processing

Figure 2:
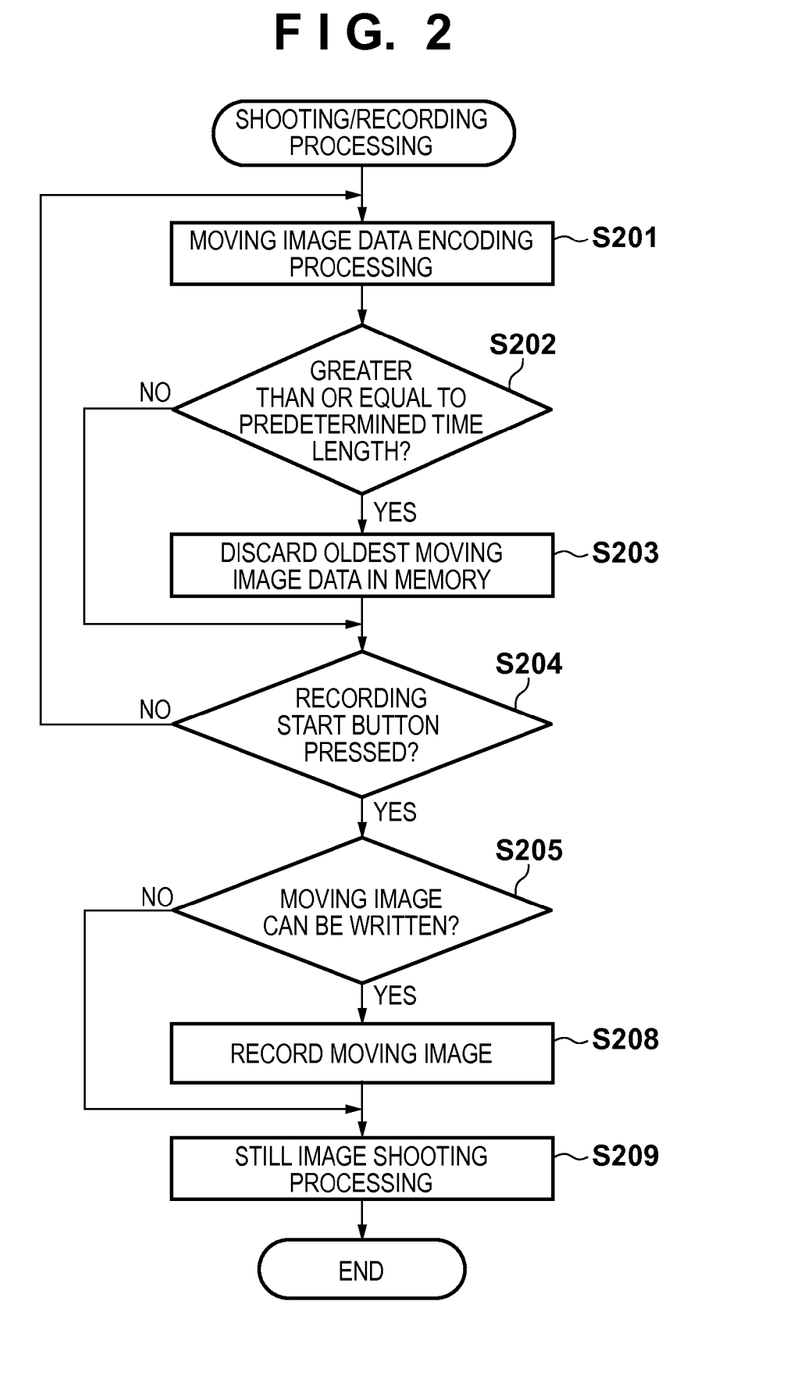
FIG. 2 is a flowchart showing shooting processing performed by the image capturing apparatus according to the embodiment.

The following describes shooting processing performed by the image capturing apparatus of the present embodiment with reference to FIG. 2.

Note that the processing in FIG. 2 is realized by the control unit 101 reading out a program recorded on the recording medium 141 to the memory 104 and executing it. If the moving image shooting mode is set due to the user operating the operation unit 102, the control unit 101 controls the blocks of the image capturing apparatus 100 so as to start moving image shooting.

In step S201 of FIG. 2, moving image data encoded by the first image processing unit 111 and the audio processing unit 121 is temporarily stored in the memory 104.

In step S202, it is determined whether or not the time length of the moving image data stored in the memory 104 is greater than or equal to a predetermined time length, whereafter the process advances to step S204 if it is greater than or equal to the predetermined time length, or advances to step S203 if it is less than the predetermined time length. Here, the predetermined time length is set to a value less than or equal to the upper limit value of the amount of moving image data that can be temporarily stored in the memory 104.

In step S203, oldest moving image data is discarded from the moving image data stored in the memory 104, and then the process advances to step S204. Moving image data may be discarded in units of seconds, or may be discarded in units of GOPs (Groups of Pictures) depending on the moving image compression format.

In step S204, it is determined whether or not the still image shooting button of the operation unit 102 has been pressed, whereafter the process advances to step S205 if the still image shooting button has been pressed, or returns to step S201 if it has not been pressed.

In step S205, it is determined whether or not the moving image data that was temporarily stored in the memory 104 in step S201 can be written to the recording medium 141. Here, the data size of the moving image data temporarily stored in the memory 104 is compared with a value obtained by subtracting the later-described estimated size of the still image data to be shot in step S209 from the amount of free space in the recording medium 141. If it is determined that the data size of the moving image data is smaller, it is determined that writing is possible, and the process advances to step S208. On the other hand, if it is determined that the data size of the moving image data is larger, it is determined that writing is not possible, and the process advances to step S209. Note that it may be determined that writing is not possible if the time length of the moving image data temporarily stored in the memory 104 is less than the predetermined time length.

In step S208, the moving image data temporarily stored in the memory 104 is recorded to the recording medium 141 as a new independent moving image file.

In step S209, the previously described still image shooting processing is performed.

As described above, according to the image capturing apparatus of the present embodiment, it is possible to shoot a moving image and a still image at the same time in association with each other with a single operation, and to record one of the simultaneously shot image data pieces as the main image and the other one as the sub image in association with each other. Note that this association can be made using DCF file numbers. For example, if the file name of a stored still image is "IMG_nnnn.JPG" (n being a numerical value between 0 and 9), then the file name of the moving image recorded at the same time will be "MVI_nnnn.MOV" such that the two files have a common "nnnn" portion. Also, there is no limitation to using the file name, and it is possible to use the file attributes in the file system (created date, modified date, etc.) or association information added to attribute information given to the header portion of the file (identifier, taken date, etc.).

Although FIG. 2 shows processing in which moving image data and still image data are captured by the first image processing unit 111, a configuration is possible in which image data captured by the first image capturing unit 110 and processed by the first image processing unit 111 and image data captured by the second image capturing unit 160 and processed by the second image processing unit 161 are recorded in association with each other. Furthermore, the images processed by the first image processing unit 111 and the second image processing unit 161 may be still images or moving images. For example, by shooting a still image of a subject with the first image capturing unit 110 and also shooting a moving image of the photographer with the second image capturing unit 160 at the same time, it is possible to shoot a change in the expression of the photographer who is shooting the subject or the like.

Figure 7:
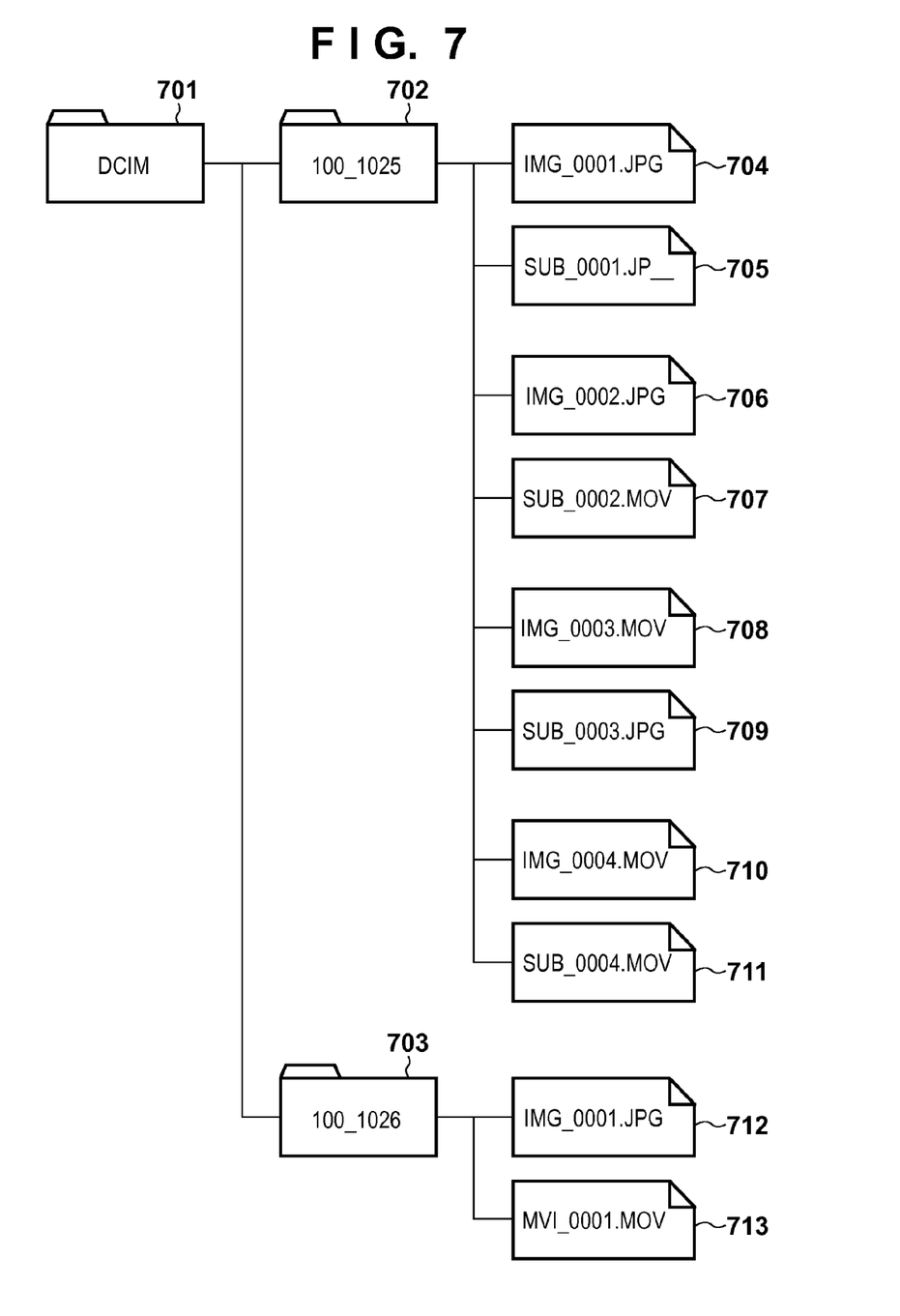
FIG. 7 is a diagram showing an example of a configuration of image files generated by the image capturing apparatus according to the embodiment.

FIG. 7 shows an example of the configuration of image data that is captured by the image capturing apparatus 100 of the present embodiment and recorded to the recording medium 141.

In FIG. 7, 701 indicates a DCF (Design rule for Camera File System) root directory, which is defined in the DCF standard generally used by digital cameras. Also, 702 and 703 indicate DCF directories that have been similarly generated in accordance with the DCF standard, 704 to 713 indicate image files that have been similarly generated in accordance with the DCF standard, the extension "JPG" indicates still images, and the extension "MOV" indicates moving images. Here, files with the same DCF file number are images associated with each other as previously described, where files with file names that begin with "IMG" are associated images that are also main images, and files with file names that begin with "SUB" are associated images that are also sub images. Specifically, the still image file 704 and the sub image file 705 are images associated with each other, and the main image is a still image. Here, the sub image file 705 is given the extension "JP_" in order to prevent multiple main images from being set for the same DCF file number. Similarly, the files 706 and 707 are associated images in which the main image is a still image and the sub image is a moving image, the files 708 and 709 are associated images in which the main image is a moving image and the sub image is a still image, and the files 710 and 711 are associated images in which the main image is a moving image and the sub image is also a moving image.

Reproduction Processing

Figure 3:
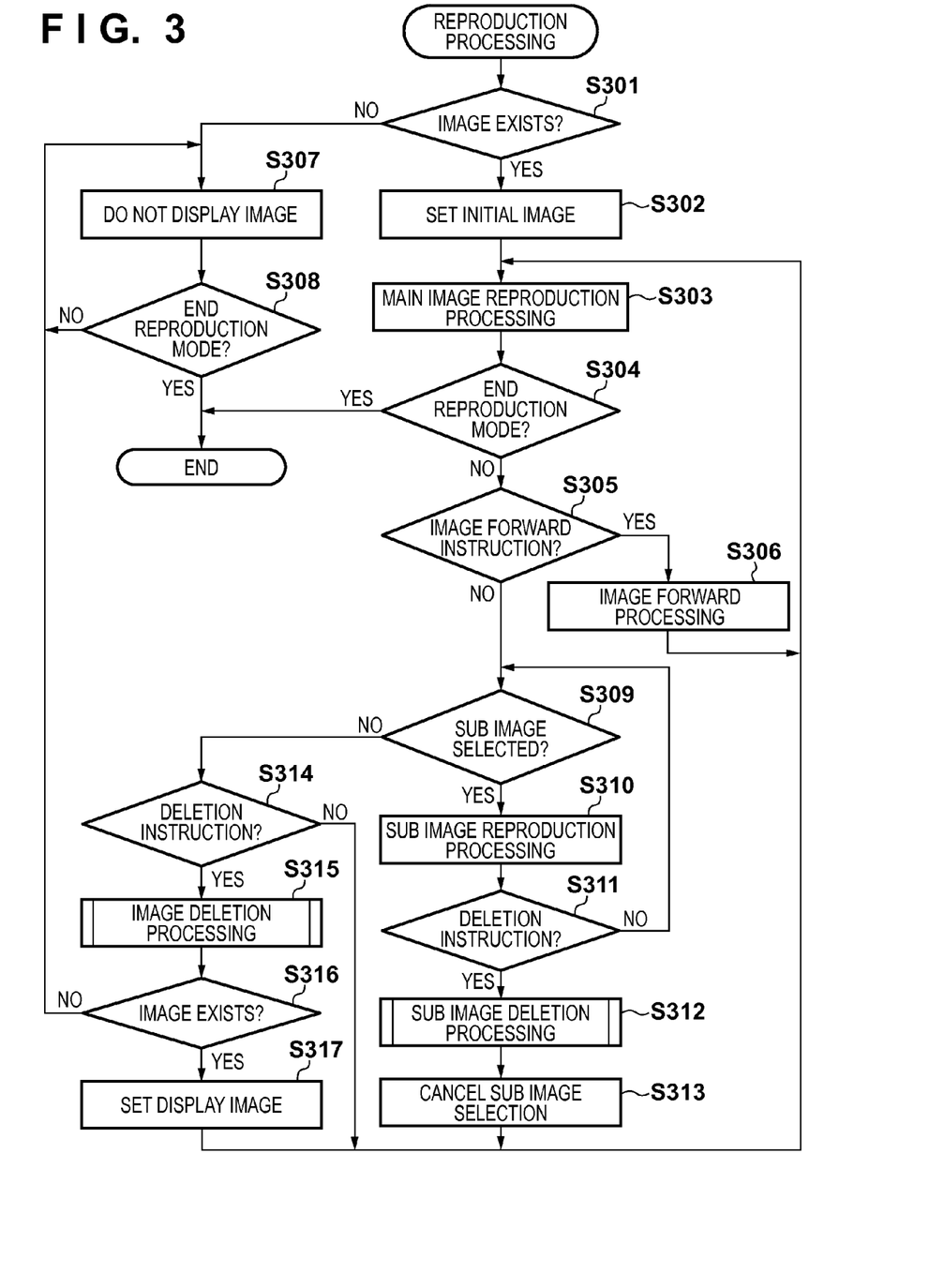
FIG. 3 is a flowchart showing reproduction processing performed by the image capturing apparatus according to the embodiment.

The following describes reproduction processing performed by the image capturing apparatus of the present embodiment with reference to FIG. 3.

Note that the processing in FIG. 3 is realized by the control unit 101 reading out a program recorded on the recording medium 141 to the memory 104 and executing it. If the reproduction mode is set due to the user operating the operation unit 102, the control unit 101 controls the blocks of the image capturing apparatus 100 so as to start reproduction processing.

In FIG. 3, in step S301, a file search is performed and it is determined whether or not a reproducible file exists on the recording medium 141, whereafter the process advances to step S307 if none exists, or advances to step S302 if one exists.

In step S302, an initial image that is to be reproduced first is set. The image with the highest DCF file number in the directory that has the highest DCF directory number is set as the initial image, for example. Specifically, in the case where the file name is determined by incrementing the DCF file number each time an image is shot and recorded, and also the directory name is determined by incrementing the DCF directory number each time a new directory is generated, the newest image that was shot most recently is set as the initial image.

In step S303, reproduction processing is performed with respect to the main image that was set in step S302, and the main image is displayed on the display unit 130.

In step S304, it is determined whether a reproduction mode end instruction has been received, whereafter the process advances to step S305 if the end instruction has not been received, or this processing is ended if the end instruction has been received.

In step S305, it is determined whether an image forward instruction has been received from the operation unit 102, whereafter the process advances to step S309 if the image forward instruction has not been received, or advances to step S306 if the image forward instruction has been received.

In step S306, image forward processing is performed in accordance with the operation instruction received in step S305. For example, it is determined whether an instruction for selecting an image that is posterior or anterior to the image being reproduced has been given through an image forward operation, and if this image selection instruction has been given, the image at the posterior or anterior location in the DCF file number sequence is set as the main image, and then the process returns to step S303. In step S303, reproduction processing is performed with respect to the main image that was set in step S306, and the main image is displayed on the display unit 130.

Figure 5A:
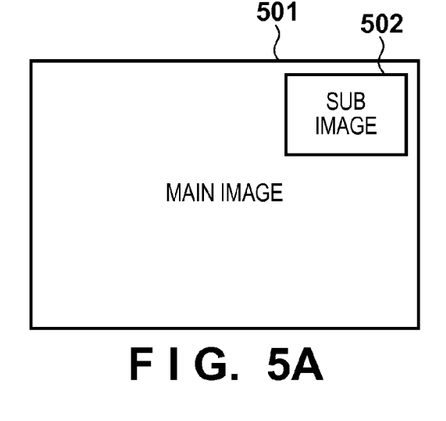
FIGS. 5A to 5E are diagrams showing examples of reproduction mode screens of the image capturing apparatus according to the embodiment.

In step S309, it is determined whether a sub image selection instruction has been received from the operation unit 102, whereafter the process advances to step S314 if the selection instruction has not been received, or advances to step S310 if the selection instruction has been received. Here, the sub image selection operation is an operation for selecting or displaying the sub image that is associated with the main image currently being displayed. For example, in the case where this operation is performed using a touch panel, as shown in FIG. 5A, a main image 501 is displayed full-screen, a sub image 502 is superimposed on the main image 501 at a relatively small size, and the sub image 502 is touched in this screen. Accordingly, there is a switch to a screen in which, as shown in FIG. 5D, the sub image 531 is displayed full-screen and the main image 532 is displayed at a small size. Note that there is no limitation to this operation being performed using a touch panel, and it may be performed by operating a button or key of the operation unit 102, for example.

In step S310, reproduction processing is performed with respect to the sub image that was selected in step S309, and the sub image is displayed on the display unit 130.

In step S311, it is determined whether an image deletion instruction has been received from the operation unit 102, whereafter the process returns to step S309 if the image deletion instruction has not been received, or advances to step S312 if the image deletion instruction has been received.

In step S312, later-described sub image deletion processing is performed, then the selection of the sub image is canceled in step S313, and the process returns to step S303.

In step S314, it is determined whether an image deletion instruction has been received from the operation unit 102, whereafter the process returns to step S303 if the image deletion instruction has not been received, or advances to step S315 if the image deletion instruction has been received.

In step S315, later-described sub image deletion processing is performed, then in step S316, a file search is performed and it is determined whether or not a reproducible file exists on the recording medium 141, whereafter the process advances to step S307 if none exists, and advances to step S317 if one exists.

In step S317, the main image that is to be reproduced is set, then the process returns to step S303 in which reproduction processing is performed with respect to the main image that was set in step S317, and the main image is displayed on the display unit 130. If an image with the DCF file number that is currently being displayed exists, that image is set as the main image that is to be reproduced, and if that image does not exist, the image at the posterior or anterior location in the DCF file number sequence is set as the main image that is to be reproduced.

Note that if the result of the file search performed in step S301 or S316 is that a reproducible file does not exist on the recording medium 141, the user is informed that no reproducible files exist by displaying text, an image, or the like in step S307.

In step S308, it is determined whether a reproduction mode end instruction has been received, whereafter the process returns to step S307 if the end instruction has not been received, or this processing is ended if the end instruction has been received.

Sub Image Deletion Processing

The following describes the image deletion processing in step S312 with reference to FIGS. 4A and 5A to 5E.

Figure 4A:
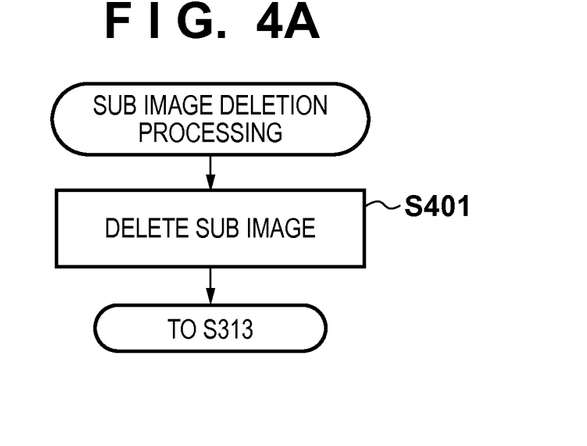
FIGS. 4A to 4E are flowcharts showing image deletion processing performed by the image capturing apparatus according to the embodiment.
Figure 5B:
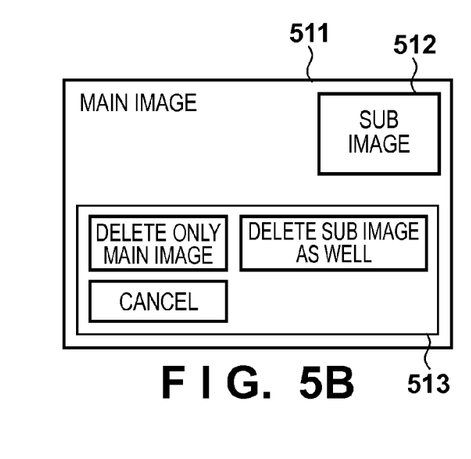
Figure 5C:
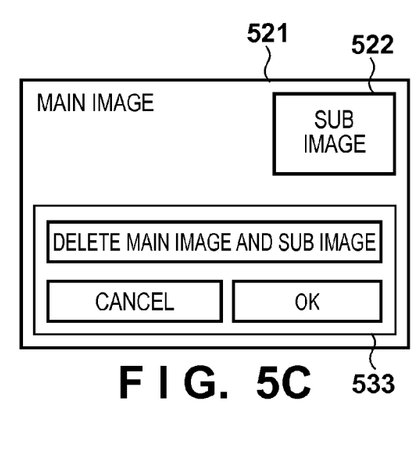
Figure 5D:
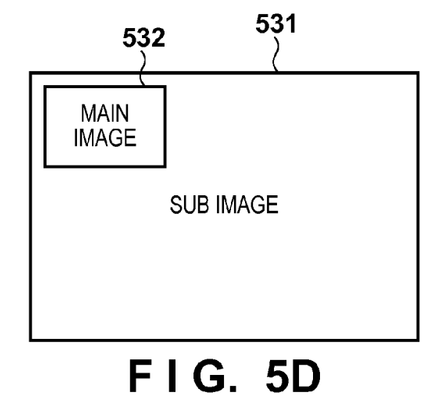
Figure 5E:
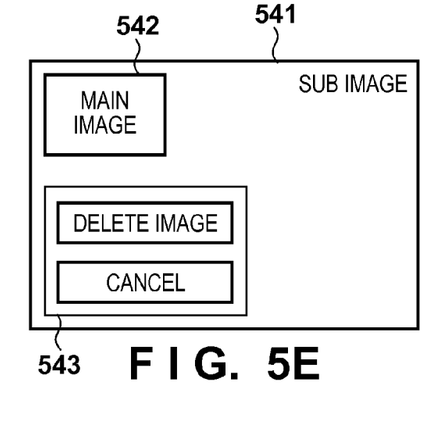

If a sub image deletion instruction is received in step S309, as shown in FIG. 5E, a touch-operable key 543 is displayed on a screen in which a sub image 541 is displayed full-screen and a main image 542 is displayed at a small size. By operating this key 543, the user can give an instruction to delete the sub image 541 currently being displayed. Note that the key 543 allows the user to select an operation for deleting the image or canceling the operation, and if the image deletion operation is selected, the sub image deletion processing shown in FIG. 4A is performed, and only the sub image is deleted in step S401.

Image Deletion Processing 1

The following describes a first example of the image deletion processing in step S315 with reference to FIGS. 4B and 5A to 5E.

If a main image deletion instruction is received in step S314, as shown in FIG. 5B, a touch-operable key 513 is displayed on a screen in which a main image 511 is displayed full-screen and a sub image 512 is displayed at a small size. By operating this key 513, the user can give an instruction to delete the main image 511 currently being displayed. Note that the key 513 allows the user to select an operation for deleting only the main image, deleting the sub image as well, or canceling the operation.

Figure 4B:
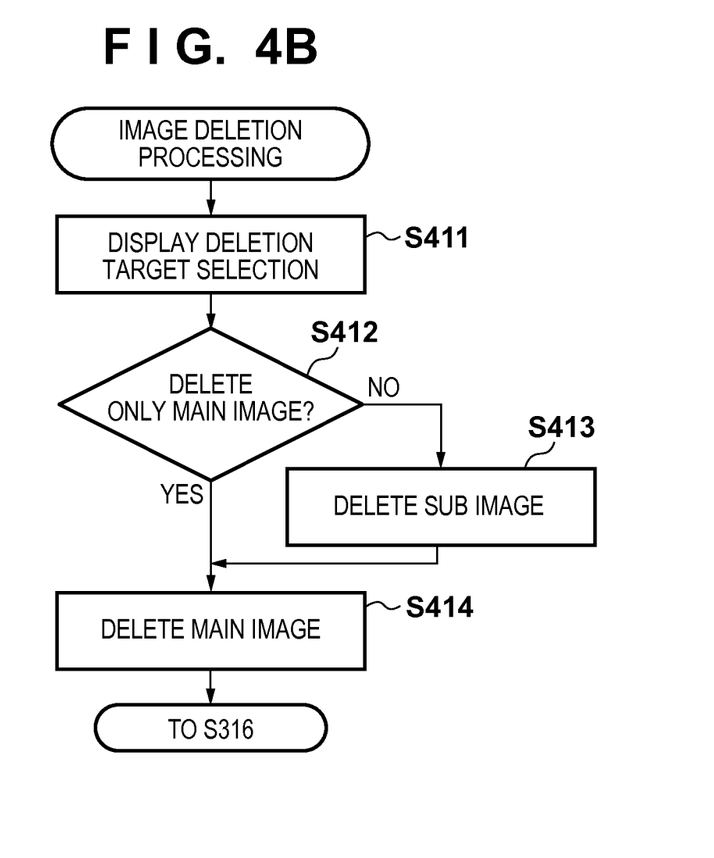

FIG. 4B shows the first example of the image deletion processing in step S315. In FIG. 4B, a GUI screen shown in FIG. 5B for selecting a deletion target is displayed in step S411. In step S412, it is determined whether the user selected the operation for deleting only the main image, deleting the sub image as well, or canceling the operation in the key 513. Here, if the operation for deleting only the main image is selected, the process advances to step S414 in which the main image currently being displayed is deleted, and then the process advances to step S316. In this case, the sub image that was not deleted is set as the main image in place of the main image that was deleted. In order to perform the processing for changing the sub image to the main image, if there is only one file with the same DCF file number, it is sufficient to set that image as the main image and change the file name so as to begin with "IMG" instead of "SUB".

If the operation for deleting the sub image as well was selected in step S412, the process advances to step S413 in which the sub image associated with the main image is deleted, and then the process advances to step S414.

Image Deletion Processing 2

The following describes a second example of the image deletion processing in step S315 with reference to FIGS. 4C and 5A to 5E.

If a main image deletion instruction is received in step S314, as shown in FIG. 5C, a touch-operable key 533 is displayed on a screen in which a main image 521 is displayed full-screen and a sub image 522 is displayed at a small size. By operating this key 533, the user can give an instruction to collectively delete the main image and sub image that are currently being displayed. Note that the key 533 allows the user to select an operation for deleting the main image and the sub image or canceling the operation.

Figure 4C:
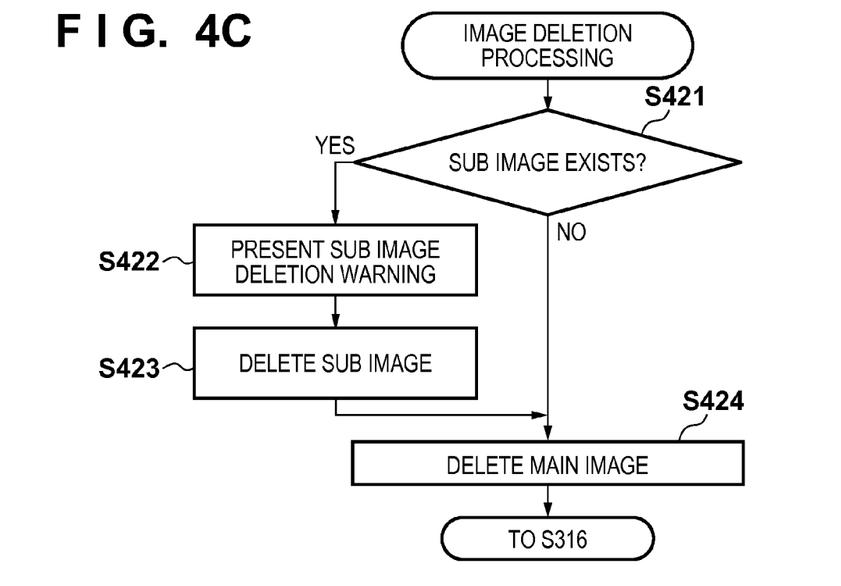

FIG. 4C shows the second example of the image deletion processing in step S315. In FIG. 4C, it is determined in step S421 whether a sub image is present on (being displayed at the same time as) the main image currently being displayed, and the process advances to step S422 if a sub image is present. In step S422, the GUI screen shown in FIG. 5C is displayed, and the user is informed that the sub image will also be deleted.

If the OK button is operated in the GUI screen shown in FIG. 5C, the process advances to step S423 in which the sub image is deleted, then advances to step S424 in which the main image is deleted, and then advances to step S316. Also, if no sub image is present in step S421, the process advances to step S424 in which the main image is deleted.

Image Deletion Processing 3

The following describes a third example of the image deletion processing in step S312 with reference to FIGS. 4D and 6A to 6C.

Figure 6A:
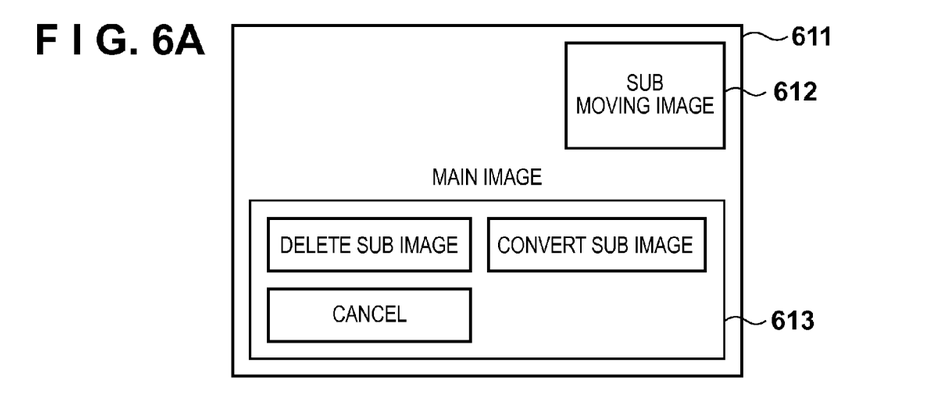
FIGS. 6A to 6C are diagrams showing examples of reproduction mode screens of the image capturing apparatus according to the embodiment.
Figure 6B:
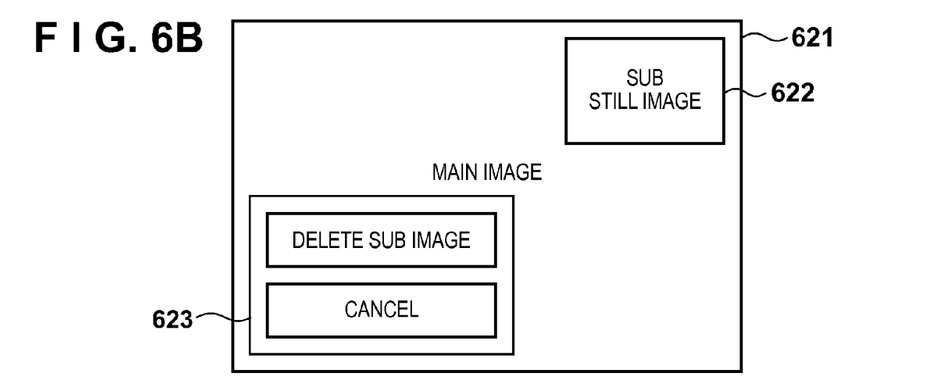

If a sub image deletion instruction is received in step S311, and the sub image is a moving image, as shown in FIG. 6A, a touch-operable key 613 is displayed on a screen in which a main image 611 is displayed full-screen and a sub image 612 is displayed at a small size. Also, if the sub image is a still image, as shown in FIG. 6B, a touch-operable key 623 is displayed on a screen in which a main image 621 is displayed full-screen and a sub image 622 is displayed at a small size. By operating the key 613 or 623, the user can give a deletion instruction or a conversion instruction for the sub image 612 or 622 currently being displayed. Note that the key 613 allows the user to select an operation for deleting or converting the sub image, or canceling the operation. Also, the key 623 allows the user to select an operation for deleting the sub image or canceling the operation.

Figure 4D:
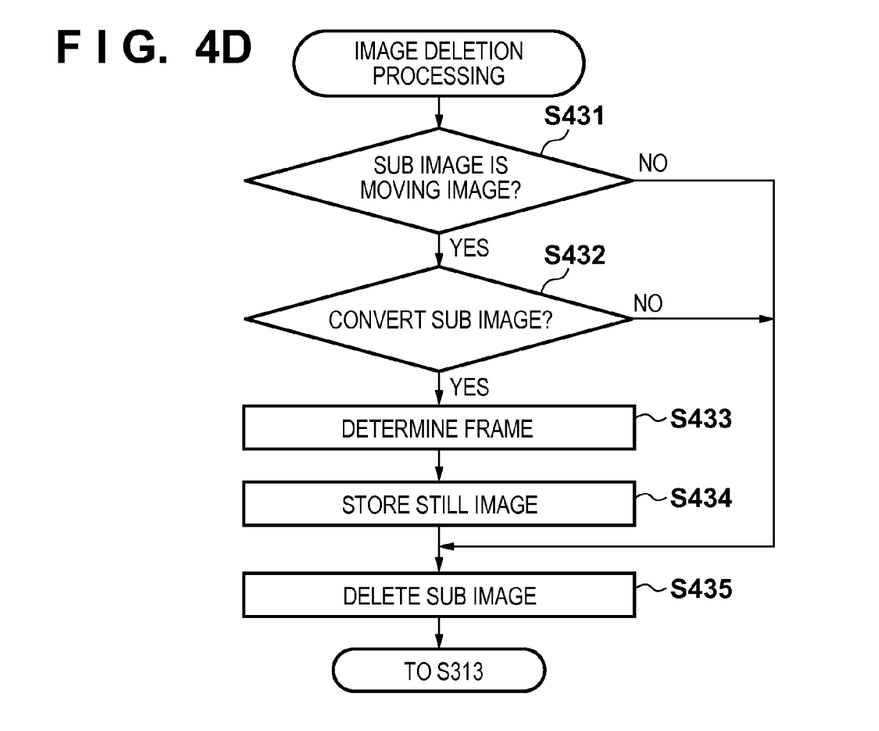

FIG. 4D shows the third example of the image deletion processing in step S312. In FIG. 4D, it is determined in step S431 whether the sub image currently being displayed is a moving image, whereafter the process advances to step S432 if it is a moving image, or advances to step S435 if it is a still image. In step S432, the GUI screen shown in FIG. 6A is displayed, and it is determined whether the user selected the "delete sub moving image" operation or the "convert sub moving image" operation, whereafter the process advances to step S435 if "delete sub moving image" was selected, or advances to step S433 if "convert sub moving image" was selected.

In step S433, a frame that is to be kept as a still image is determined. For example, the first frame of the sub moving image, the frame at the elapse of a predetermined time, or a frame of interest in the moving image is extracted. Note that the frame of interest is, for example, a frame in the moving image at which high-volume audio was input, or a frame in which it was detected that the subject is smiling.

In step S434, the frame that was selected in step S433 is stored as the still image in place of the sub image that is to be deleted. The still image to be stored here is given a file name with the same DCF file number as the main image in order to associate it with the main image as previously described. In step S435, the sub image or sub moving image that is currently being displayed is deleted, and then the process returns to step S313.

Image Deletion Processing 4

The following describes a fourth example of the image deletion processing in step S315 with reference to FIGS. 4E and 6A to 6C.

Figure 6C:
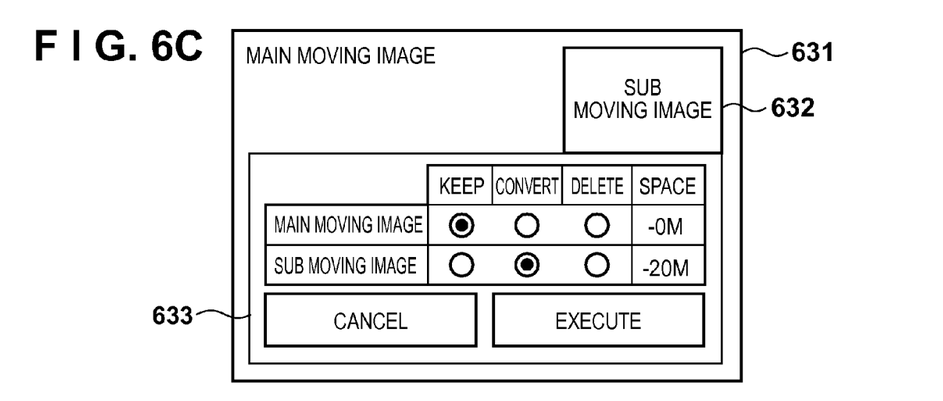

If a main image deletion instruction is received in step S314, as shown in FIG. 6C, a touch-operable key 633 is displayed on a screen in which a main image 631 is displayed full-screen and a sub image 632 is displayed at a small size. By operating this key 633, the user can give an instruction to delete, convert, or not delete the main image 631 and/or sub image 632 currently being displayed, and the amount by which the data size will decrease through the processing is presented. Note that the key 633 allows the user to set an operation for keeping, converting, or deleting the main image and/or the sub image, and also allows the user to select an operation for executing the corresponding setting or canceling the operation.

Figure 4E:
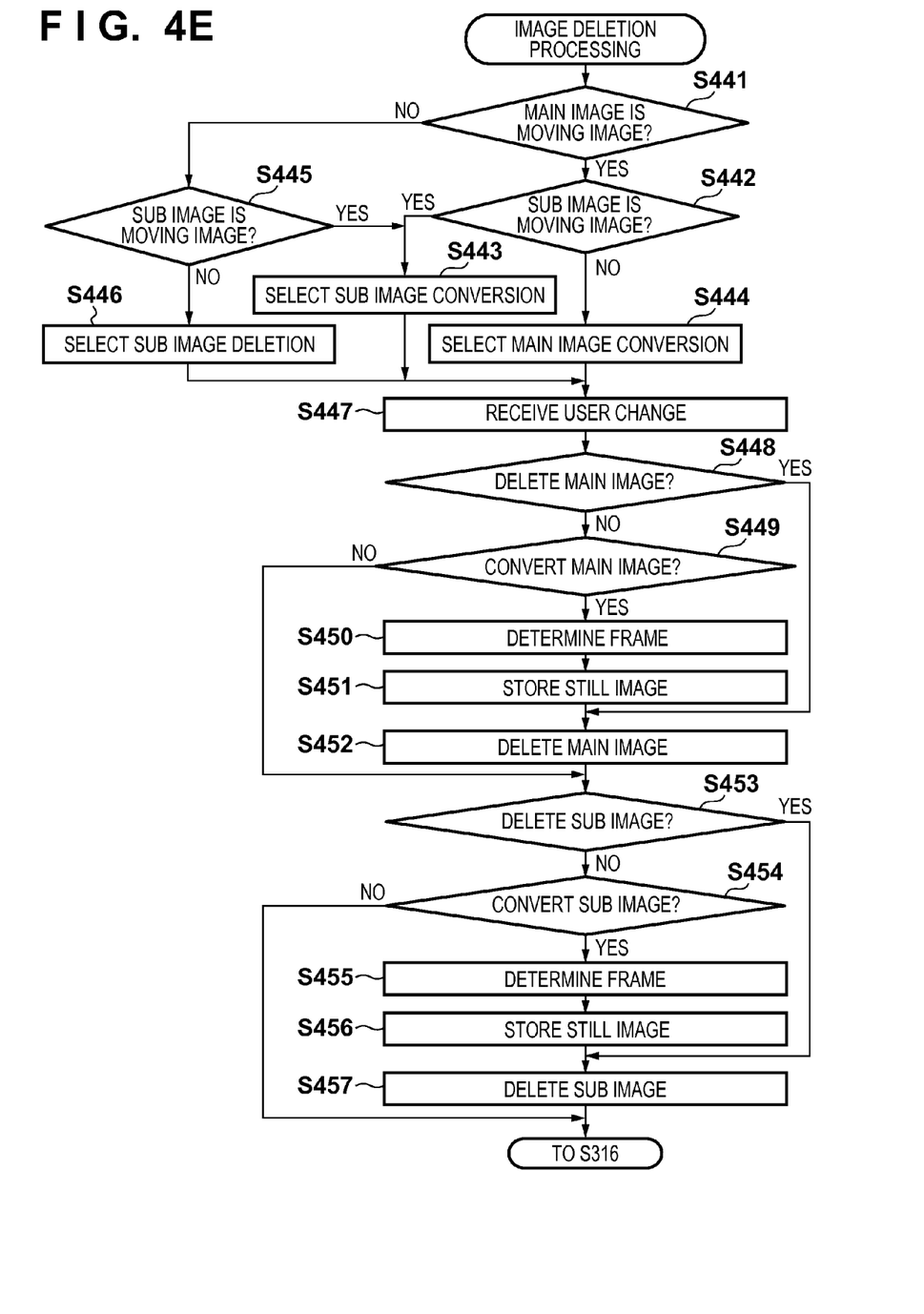

FIG. 4E shows the fourth example of the image deletion processing in step S315. In FIG. 4E, it is determined in step S441 whether the main image currently being displayed is a moving image, whereafter the process advances to step S442 if it is a moving image, or advances to step S445 if it is a still image. In step S442, it is determined whether the sub image for which a deletion instruction was given in step S314 is a moving image, whereafter the process advances to step S443 if it is a moving image, or advances to step S444 if it is a still image.

In step S443, both the main image and the sub image are moving images, and therefore sub image conversion is selected in the GUI screen shown in FIG. 6C, and the process advances to step S447. In step S444, the main image is a moving image and the sub image is a still image, and therefore main image conversion is selected in the GUI screen shown in FIG. 6C, and the process advances to step S447.

In step S445, it is determined whether the sub image for which a deletion instruction was given in step S314 is a moving image, whereafter the process advances to step S443 if it is a moving image, or advances to step S446 if it is a still image. In step S446, both the main image and the sub image are still images, and therefore sub image deletion is selected in the GUI screen shown in FIG. 6C, and the process advances to step S447.

In step S447, a setting change is received from the user with respect to processing candidates for the main image and/or sub image selected in steps S441 to S446. This setting change operation performed by the user is an operation in which, for example, in the GUI screen shown in FIG. 6C, the user uses the touch panel or the operation unit 102 to select a "keep", "convert", or "delete" radio button as the content of the processing to be performed on the main image and/or sub image.

In steps S448 to S452, the main image is subjected to processing similar to the processing in FIG. 4D, and thus the main image is deleted or converted into a still image. In steps S453 to S457, the sub image is subjected to processing similar to the processing in FIG. 4D, and thus the sub image is deleted or converted into a still image.

According to the above-described image deletion processing 1 and 2, if the image currently being displayed full-screen is a sub image, the sub image can be immediately deleted, and if it is a main image, the user is clearly informed that a sub image exists. This makes it possible for the user to select whether to delete the main image and the sub image at the same time, or select and delete one of them.

Also, according to the above-described image deletion processing 3 and 4, it is possible to present the user with appropriate processing candidates according to whether the main image and/or sub image is a still image or a moving image. Accordingly, processing for converting or deleting a main moving image and a sub moving image is presented while prioritizing the keeping of main images, thus making it possible to suppress a reduction in the free space of the recording medium.

Note that although main images are prioritized over sub images, and conversion processing that prioritizes moving images over still images is presented in the present embodiment, the priorities may be changed according to a comparison of the amount of space occupied in the recording medium by main images and sub images.

Also, although a main image and a sub image are managed in association with each other in the present embodiment, a configuration is possible in which they are managed as separate files, and processing for embedding the sub image in the main image is performed. In this case, when a main image deletion instruction is received, the user may be presented with the processing candidates of deleting only the main image, deleting the sub image as well, and deleting both the main image and the sub image.

Also, although the target in the present embodiment is images generated by image capturing units and image processing units included in the apparatus itself, the present invention is similarly applicable to the case where the target is images acquired from an external device, a server, or the like via a communication means such as a network.

Also, the present embodiment describes a configuration in which the reception of a main image deletion instruction is accompanied by presenting the option of deleting the sub image as well, whereas the reception of a sub image deletion instruction is not accompanied by presenting the option of deleting the main image; however, a mode may be prepared in which the reception of a deletion instruction for either the main image or the sub image is always accompanied by presenting the option of deleting the other image as well such that the user's intention can be confirmed.

Also, a configuration is possible in which the user can arbitrarily set a mode in which the deletion of the main image is accompanied by presenting the option of deleting the sub image as well, whereas the deletion of the sub image is not accompanied by presenting the option of deleting the main image as well, as in the present embodiment.

For example, the user may be allowed to select a desired mode from among the following.

"Mode in which the deletion of the main image is accompanied by presenting the option of deleting the sub image as well, but the deletion of the sub image is not accompanied by presenting the option of deleting the main image as well"

"Mode in which the reception of a deletion instruction for either the main image or the sub image is always accompanied by presenting the option of deleting the other image as well"

"Mode in which the reception of a deletion instruction for either the main image or the sub image is not accompanied by presenting the option of deleting the other image as well"

As another variation, a mode may be prepared in which the user can arbitrarily set one of three selectably presented options, namely "delete only main image", "delete sub image as well", and "delete both main image and sub image".

Other Embodiments

Embodiments of the present invention can also be realized by a computer of a system or apparatus that reads out and executes computer executable instructions recorded on a storage medium (e.g., non-transitory computer-readable storage medium) to perform the functions of the above-described embodiment of the present invention, and by a method performed by the computer of the system or apparatus by, for example, reading out and executing the computer executable instructions from the storage medium to perform the functions of the above-described embodiment. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-147921, filed Jul. 16, 2013 which is hereby incorporated by reference herein in its entirety.

What is claimed is:

1. An image management apparatus comprising:
an input unit configured to input a first image and a second image;
a storage unit configured to store the first image and the second image in association with each other;
a selection unit configured to select an image to be deleted out of the first and second images; and
a control unit configured to perform control such that, in a case where the first image is selected by the selection unit, an option of deleting the second image stored in association with the first image is presented, and subsequently processing for deleting the first image is performed, and in a case where an instruction to delete the second image is received, processing for deleting the second image is performed without presenting an option of deleting the first image stored in association with the second image.

2. The apparatus according to claim 1, wherein in a case where the image for which the deletion instruction is received is a moving image, a still image is generated from the moving image and stored as a representative image when the deletion processing is performed.

3. The apparatus according to claim 1, further comprising a first image capturing unit and a second image capturing unit, wherein the first image capturing unit and the second image capturing unit have different image capturing directions.

4. The apparatus according to claim 3, wherein the second image capturing unit shoots a photographer.

5. The apparatus according to claim 3, wherein the size of image data captured by the first image capturing unit is greater than the size of image data captured by the second image capturing unit.

6. The apparatus according to claim 1, further comprising a display control unit configured to perform control such that the second image is superimposed on the first image.

7. An image management method comprising:
inputting a first image and a second image;
storing the first image and the second image in association with each other;
selecting an image to be deleted out of the first and second images; and
performing control such that, in a case where the first image is selected, an option of deleting the second image stored in association with the first image is presented, and subsequently processing for deleting the first image is performed, and in a case where an instruction to delete the second image is received, processing for deleting the second image is performed without presenting an option of deleting the first image stored in association with the second image.

8. A non-transitory computer-readable storage medium storing a program for causing a computer to execute an image management method comprising:
inputting a first image and a second image;
storing the first image and the second image in association with each other;
selecting an image to be deleted out of the first and second images; and
performing control such that, in a case where the first image is selected, an option of deleting the second image stored in association with the first image is presented, and subsequently processing for deleting the first image is performed, and in a case where an instruction to delete the second image is received, processing for deleting the second image is performed without presenting an option of deleting the first image stored in association with the second image.

* * * * *